United States Patent Office 3,376,119
Patented Apr. 2, 1968

3,376,119
POROUS METALS
Ludwig Bruns and Günther Schnuchel, Dormagen, Germany, assignors to Erdölchemie Gesellschaft mit beschränkter Haftung, Leverkusen, Germany, a corporation of Germany
No Drawing. Filed May 27, 1964, Ser. No. 370,681
Claims priority, application Germany, Aug. 20, 1963, E 25,364
17 Claims. (Cl. 29—192)

ABSTRACT OF THE DISCLOSURE

Heating a mixture of heat-resistant filler particles and a metal compound capable of being transformed by thermal decomposition into the corresponding metal at a temperature, e.g. 200–400° C., below the sintering temperature yet sufficient for such decomposition, whereby the resulting metal coats the filler particles and welds them together at their contact points to form a high strength porous metal coated body, e.g. of random or predetermined shape, usable as an oxidation catalyst, e.g. for olefin oxidation.

---

This invention relates to porous metals and to their production.

Porous metal bodies are frequently required for technical purposes. The field of application thereof is concerned for example with catalytic-chemical reactions, filtration processes or special electrochemical processes. In this connection, the permeability of the material for gases and liquids plays an important part.

Generally, such catalysts are prepared by coating preshaped ceramic supports with a layer of the catalytically active metal, or the catalytically active metal is produced by impregnating the ceramic moulded support element with a chemical compound of the catalytically active metal and thereafter decomposing the compound in and on the support.

In every case, it is necessary to use solid pre-shaped ceramic supports, the manufacture of which is often costly. In addition, it is difficult to use molded metallic bodies as a support material.

It has now been found that porous metals are obtained if heat-resistant materials, for example ceramic, oxidic or metallic materials, are incorporated as fillers by mixing them into such metal compounds as can be transformed by thermal decomposition into metal, and if the free metals are thereafter produced by a heat treatment.

With the process according to the invention, the filler material is held together by the metal formed by the decomposition of the metal compound. The grain of the unbroken filler material, the dimensions of which are generally between 10µ and 2000µ, is covered by a skin of the metal and is welded at the points of contact with the adjacent grains of the filler material. If the decomposition process is carried out in a suitable form, it is possible thereby to produce metal bodies with certain properties, as for example catalyst bodies. Since it is possible by means of the process according to the invention also to use metal bodies of for example catalytically inactive metal as filler material, catalysts having an extremely high heat conductivity can be produced. In this respect, it is particularly important that, in contrast to the so called sintered metals, it is not necessary to reach the region of the melting point of the catalytically inactive metal, but the decomposition temperature of the compound of the catalytically active metal being used is sufficient in order to give the moulded element the necessary cohesion. In general, the decomposition temperatures are within the range of from 200 to 400° C., whereas it is often necessary to use temperatures higher than 1000° C. in order to produce a sintered metal.

The pore volume of the moulded elements obtained by the process of the invention can be varied within the widest possible limits and the pore volume is dependent on the grain size of the filler material which is used. It is readily possible to vary the said volume within the range of from 10 to 250µ. In addition, the pore volume can be influenced by the mixture of ceramic, oxidic or metallic catalytically inactive filler material and by the chemical compound of the catalytically active material, to which there have been added substances which are destroyed at the decomposition temperature of the metal compound and thereby cause the formation of additional cavities in the finished moulded element. Such substances ("burning-out substances") can for example be cellulose powders or filaments, or sawdust, activated carbon or those materials of which the melting point is above the decomposition temperature of the chemical metal compound used. Generally, the proportion of these burning-out substances in such mixtures will not amount to more than 10% by weight.

The process as described is suitable in excellent manner for the production of moulded elements of which the catalytically active component consists wholly or in part of silver or copper. Such catalysts are frequently used in the chemical art for oxidation reactions, as for example for the production of olefine oxides, such as ethylene oxide or propylene oxide, the dehydrogenation of primary alcohols to the corresponding aldehydes and the introduction of oxygen into hydrocarbons.

Suitable chemical compounds of silver or copper are the oxides and the salts of the metals, and in particular the salts of α-hydroxycarboxylic acids, for example the lactates.

The catalysts obtained according to the invention can for example be produced by introducing the ceramic, oxidic or metallic filler into a melt of for example silver lactate. The consistency of the mixture which is formed can be influenced by raising or lowering the temperature. It may be particularly advantageous for the mixture of filler and metal compound, for example silver lactate, to be subjected to a thermal pre-treatment, in which the silver lactate is partially decomposed. By this means, the viscosity of the mixture is greatly increased and the moulding thereof is assisted. When the required content of filler is reached, the possibly initially heated mixture can be moulded, either by pouring it into suitable moulds and allowing it to solidify or by extruding it in a known manner by means of a worm press to form continuous lengths, which can be broken into pieces of suitable length after having solidified. The moulded or shaped elements obtained by one method or another are now heated in an electric furnace to a temperature of 300° C. and left therein until the decomposition of the silver lactate is completed. In this way, depending on the size of the pore volume, pervious shaped elements of high strength are obtained. The ceramic or metallic filler is completely enveloped and can no longer be seen.

It is additionally possible with the process according to the invention also to use those filler materials from which it is not possible by known methods to produce shaped elements by pressing or sintering, for example silicon carbide. Since the process shows relatively great latitude in its standards regarding the shape of the fillers, it is also possible for waste products of the said types of fillers to be used.

With the process as described, it is readily possible to admix the promoters which are usual for the catalysts. These are preferably also used in the form of their salts, for example the lactates. Promoters which are frequently employed are the alkaline earth metals, the rare earth metals or the noble metals, for example magnesium, barium, cobalt, nickel, gold or platinum. The amount of promoter metals added will generally vary between 1 and 15% by weight of the catalytically active metal.

Example 1

(a) 200 g. of silicon carbide having a grain size 0.2 to 0.4 mm. are mixed with 40 g. of pure silver lactate and heated in a porcelain dish to 180° C. while stirring. The mixture assumes a dark colour and is partially decomposed. After about 30 minutes, it has assumed a consistency which can be designated as resinous. The resinous mass is moulded in a tabletting press to form shaped elements of the required dimensions. These elements are now transferred to an electric furnace for the final decomposition and activation and heated in the furnace for 3 hours to 300° C. In this way, there are obtained 220 g. of a porous pervious material with a content of 10% by weight of silver, which is excellently suitable for oxidation reactions, as will be seen from the following example.

(b) A tube with an internal diameter of 22 mm. and a length of 1 m., heated by means of an oil jacket, is filled with the catalyst thus obtained. A gas of the composition as indicated below is then caused to flow therethrough at a temperature of 260° C. and at a velocity of 200 litres per hour.

| | Percent by volume |
|---|---|
| Oxygen | 5.84 |
| Carbon dioxide | 6.72 |
| Ethylene | 5.14 |
| Nitrogen | Remainder |

An analysis of the gas which is formed shows the following values:

| | Percent by volume |
|---|---|
| Oxygen | 3.83 |
| Carbon dioxide | 7.78 |
| Ethylene | 3.60 |
| Ethylene oxide | 1.09 |
| Nitrogen | Remainder |

Example 2

60 g. of coarse aluminium powder having a grain size 0.7 mm. and 30 g. of a melt of pure silver lactate are introduced into a shallow mould consisting of sheet steel and having the dimensions 20 x 10 x 2 cm. The mixture is homogenized at 100° C. and subjected at 180° C. to a thermal pre-treatment. When the consistency of the silver lactate has become resinous, the mixture is flattened or levelled. The final decomposition and activation is carried out in the mould of an electric furnace over a period of 3 hours at a temperature of 300° C. In this way, there is obtained a sheet of porous material, the silver content of which is about 20% by weight. The sheet can be broken into pieces of the required size. The fragments are suitable as an oxidation catalyst.

We claim:

1. Process for producing a porous metal coated body which comprises heating a mass constituting a mixture of heat-resistant filler particles and a metal compound which is transformable by thermal decomposition into the corresponding metal, to cause thereby thermal decomposition of said metal compound to said metal and coating of said filler particles therewith and welding via said metal of such coated filler particles at their points of contact, whereby to produce such porous metal coated body.

2. Process according to claim 1 wherein the metal compound is a silver compound.

3. Process according to claim 1 wherein the metal compound is a copper compound.

4. Process according to claim 1 wherein the corresponding α-hydroxycarboxylic acid metal salt is used as the metal compound.

5. Process according to claim 4 wherein such salt is the corresponding silver salt.

6. Process according to claim 4 wherein such salt is the corresponding copper salt.

7. Process according to claim 1 wherein the corresponding metal lactate is used as the metal compound.

8. Process according to claim 7 wherein such lactate is the corresponding silver lactate.

9. Process according to claim 7 wherein such lactate is the corresponding copper lactate.

10. Process according to claim 7 wherein the metal lactate is subjected to a thermal pre-treatment with partial decomposition for increasing the viscosity of the mass.

11. Process according to claim 1 wherein a metal additive selected from the group consisting of magnesium, barium, cobalt, nickel, gold and platinum is additionally present in the mixture.

12. Process according to claim 1 wherein a heat decomposable filler material which is decomposed at the temperature at which thermal decomposition of the metal compound takes place is additionally present in the mixture in an amount up to about 10% by weight.

13. Process according to claim 1 wherein the heating is carried out at about 200–400° C. and said heat-resistant filler particles are composed of a member selected from the group consisting of ceramic, oxidic and metallic substances.

14. High strength porous metal coated body produced according to claim 1, wherein the body is composed of heat-resistant filler particles completely coated with a skin of a metal formed in situ by thermal decomposition of a corresponding metal compound capable of being transformed by thermal decomposition into such metal at a temperature below the sintering temperature thereof yet sufficient for such decomposition, the metal skin welding such particles together at their points of contact to form such high strength porous metal coated body.

15. In a hydrocarbon catalytic oxidation process in which a hydrocarbon is oxidized with oxygen in the presence of a catalyst, the improvement which comprises carrying out the hydrocarbon oxidation in the presence of an oxidation catalyst produced according to claim 1.

16. Improvement according to claim 15 wherein the hydrocarbon is olefin and the oxidation product is the corresponding alkylene oxide.

17. Improvement according to claim 16 wherein the olefin is ethylene and the oxidation product is ethylene oxide.

References Cited

UNITED STATES PATENTS

| 1,642,349 | 9/1927 | Williams et al. | 75—20 |
| 1,919,730 | 7/1933 | Koenig et al. | 75—20 |
| 2,901,441 | 8/1959 | Waterman | 252—463 |

HYLAND BIZOT, *Primary Examiner.*

RICHARD O. DEAN, DAVID L. RECK, *Examiners.*